US007802032B2

(12) United States Patent
Christenson

(10) Patent No.: US 7,802,032 B2
(45) Date of Patent: Sep. 21, 2010

(54) CONCURRENT, NON-BLOCKING, LOCK-FREE QUEUE AND METHOD, APPARATUS, AND COMPUTER PROGRAM PRODUCT FOR IMPLEMENTING SAME

(75) Inventor: David Alan Christenson, Fergus Falls, MN (US)

(73) Assignee: International Business Machines Corporation, Armonk, NY (US)

( * ) Notice: Subject to any disclaimer, the term of this patent is extended or adjusted under 35 U.S.C. 154(b) by 894 days.

(21) Appl. No.: 11/559,004

(22) Filed: Nov. 13, 2006

(65) Prior Publication Data

US 2008/0112423 A1 May 15, 2008

(51) Int. Cl.
G06F 3/00 (2006.01)
(52) U.S. Cl. .............................. 710/52; 710/53; 710/54; 710/56
(58) Field of Classification Search ........................ None
See application file for complete search history.

(56) References Cited

U.S. PATENT DOCUMENTS

| 5,671,446 | A | 9/1997 | Rakity et al. |
| 6,523,060 | B1 * | 2/2003 | Kao ........................... 709/202 |
| 6,889,269 | B2 | 5/2005 | Forin et al. |
| 6,988,186 | B2 | 1/2006 | Eickemeyer et al. |
| 2004/0040018 | A1 * | 2/2004 | Fleming et al. ............. 717/162 |
| 2004/0125665 | A1 * | 7/2004 | Chelcea et al. .............. 365/200 |
| 2005/0066082 | A1 * | 3/2005 | Forin et al. .................... 710/52 |
| 2006/0004967 | A1 * | 1/2006 | Mithal et al. ................ 711/152 |
| 2007/0169123 | A1 * | 7/2007 | Hopkins ...................... 718/100 |

OTHER PUBLICATIONS

Pitts, Robet I., "Queue—Linked-List Implementation—Types", www.cs.bu.edu/teaching/c/queue/linkedlist, pp. 1-7.*
Maged M. Michael et al., "Simple, Fast, and Practical Non-Blocking and Blocking Concurrent Queue Algorithms", Symposium of Principles of Distributed Computing, 1996. http://www.cs.rochester.edu/u/scott/papers/1996_PODC_queues.pdf.
Ross Bencina, "Some notes on lock-free and wait-free algorithms", http://www.audiomulch.com/~rossb/code/lockfree/, page last updated May 11, 2006.

(Continued)

*Primary Examiner*—Eron J Sorrell
(74) *Attorney, Agent, or Firm*—Matthew J. Bussan

(57) ABSTRACT

A dummy node is enqueued to a concurrent, non-blocking, lock-free FIFO queue only when necessary to prevent the queue from becoming empty. The dummy node is only enqueued during a dequeue operation and only when the queue contains a single user node during the dequeue operation. This reduces overhead relative to conventional mechanisms that always keep a dummy node in the queue. User nodes are enqueued directly to the queue and can be immediately dequeued on-demand by any thread. Preferably, the enqueueing and dequeueing operations include the use of load-linked/store conditional (LL/SC) synchronization primitives. This solves the ABA problem without requiring the use a unique number, such as a queue-specific number, and contrasts with conventional mechanisms that include the use of compare-and-swap (CAS) synchronization primitives and address the ABA problem through the use of a unique number. In addition, storage ordering fences are preferably inserted to allow the algorithm to run on weakly consistent processors.

8 Claims, 9 Drawing Sheets

OTHER PUBLICATIONS

Michael Barr, "Introduction to Priority Inversion", http://www.embedded.com/story/OEG20020321S0023, Apr. 1, 2002.

Julian M. Bucknall, "Lock-Free Data Structures: The Queue", http://www.boyet.com/Articles/LockfreeQueue.html., Oct. 30, 2005.

Lindsay Groves et al., "A Practical Lock-Free Queue Implementation and its Verification", FORTE, Madrid, Spain, Sep. 2004, http://www.cs.waikato.ac.nz/~stever/FMinNZ/lgslides.pdf#search=%22lock-free%20queue%22.

* cited by examiner

```
struct Node {                                    ──── 501
        Node * volatile xNextPtr;
        // User data.

};

class Queue {                                    ──── 502
public:
        // Enqueue and dequeue operations
        void enqueue(Node *newNodePtr);          ──┬── 503
        Node* dequeue();          ──── 504
private:
        // Utility functions
        void enqueueStep2();          ──── 505
        void enqueueDummy();          ──── 506

// Data
        Node * volatile xHeadPtr;
        Node * volatile xTailPtr;
        Node * const xDummyPtr;
}
```

FIG. 5

```
void Queue::enqueue(Node *newNodePtr) {

// Enqueue step 1 - link new node to end of queue
for(;;) {————————————————— 601
   // Take snapshot of tail pointer.
   Node * const tailPtr = (Node*)xTailPtr; ——— 602

// Take snapshot of tail node's next pointer and set reservation.
   Node * const tailNextPtr = (Node*)ldarx(&(tailPtr->xNextPtr)); ——— 603

STORAGE_ORDERING_FENCE; // Force store of xTailPtr ——— 604

// Tail pointer has not changed?
   if(tailPtr == xTailPtr) {——— 605

// Tail's next pointer is non-NULL (partial enqueue)?
      if(tailNextPtr) { ————————————— 605.1
         enqueueStep2(); // help get enqueue step 2 done.
         continue;   // try again
      }

// Note, the current tail node cannot be dequeued without detection
      // by the stdcx below, since another node must be enqueued to the
      // tail before the current tail can be dequeued and this enqueue will
      // be detected.

// xTailPtr->xNextPtr = newNodePtr
      if(stdcx((uint64)newNodePtr, &tailPtr->xNextPtr)) ——— 605.2
         break;      // enqueue successful, just need to update tail
   }
};

// Enqueue step 2 - set queue's tail pointer to new node.
   enqueueStep2(); ——— 606
}
```

FIG. 6

```
void Queue::enqueueStep2() {
    // Enqueue step 2 - set queue's tail pointer to new node pointer.
    for(;;) { ——— 701

Node * const tailPtr = (Node*)ldarx(&xTailPtr); ——— 702

STORAGE_ORDERING_FENCE; // Force store of xNextPtr ——— 703

Node * const tailNextPtr = (Node*)tailPtr->xNextPtr; ——— 704

// Tail has caught up completely?
        if(!tailNextPtr) // Yes ——— 705
            break;

// xTailPtr = xTailPtr->xNextPtr
        if(stdcx((uint64)tailNextPtr,&xTailPtr)) ——— 706
            break;
    };
}
```

FIG. 7

```
Node* Queue::dequeue() {
    for(;;) {────────────────── 801
        // Load and reserve head pointer.
        Node * const headPtr = (Node*)ldarx(&xHeadPtr); ────── 802

STORAGE_ORDERING_FENCE; // Force store of xTailPtr and xNextPtr ────── 803

// Take snapshot of head's next pointer.
        Node * const headNextPtr = headPtr->xNextPtr; ────── 804

// Only one node enqueued or enqueue is falling behind?
        if(headPtr == xTailPtr) { // Yes ────── 805
            // Only one node enqueued?
            if(headNextPtr == NULL) {
                // Only dummy node is enqueued?
                if(headPtr == xDummyPtr) {
                    // Verify that dummy node was not dequeued?
                    if(stdcx((uint64)headNextPtr,&xHeadPtr)) ────── 805.1
                        return NULL; // Empty queue.
                }
                else
                    // Enqueue the dummy node to keep the queue from going empty.
                    // (The enqueue method always assume a non-empty queue.)
                    enqueueDummy(); ────── 805.2
            }
            else // enqueue is falling behind...
                // We can't dequeue a node that the tail still points at.
                enqueueStep2(); // help finish the enqueue ────── 805.3 continue;    // Try again
        }

// The stdcx, will detected another concurrent dequeue.
        // xHeadPtr = xHeadPtr->xNextPtr
        if(stdcx((uint64)headNextPtr,&xHeadPtr)) { ────── 806
            // Clear dequeued.
            headPtr->xNextPtr = NULL; ────── 806.1
            if(headPtr != xDummyPtr) ────── 806.2
                return headPtr;
            else; // Dummy node dequeued. ────── 806.3
        }
    };
}
```

FIG. 8

```
void Queue::enqueueDummy() { for(;;) {                                            ─── 901
        // Snapshot queue's tail pointer
        Node * const tailPtr = (Node*)xTailPtr;  ─── 902
        // load and reserve tail's next pointer.
        Node * const tailNextPtr = (Node*)ldarx(&(tailPtr->xNextPtr));  ─── 903

STORAGE_ORDERING_FENCE; // Force store of xHeadPtr and xTailPtr ─── 904

// Do we still need to enqueue dummy node?
        if(tailPtr == xTailPtr &&   // Tail did not change? ─── 905
           xHeadPtr == tailPtr &&   // One node enqueued?
           tailNextPtr == NULL &&   // enqueue is not failing behind?
           tailPtr != xDummyPtr) {  // Only node is not the dummy?
            // xTailPtr->xNextPtr = xDummyPtr
            if(stdcx((uint64)xDummyPtr, &(tailPtr->xNextPtr)))  ─── 905.1
                break;    // enqueue successful, just need to update tail
        }
        else ─── 906
            break;
    };
}
```

FIG. 9

CONCURRENT, NON-BLOCKING, LOCK-FREE QUEUE AND METHOD, APPARATUS, AND COMPUTER PROGRAM PRODUCT FOR IMPLEMENTING SAME

BACKGROUND OF THE INVENTION

1. Field of Invention

The present invention relates in general to the digital data processing field. More particularly, the present invention relates to concurrent, non-blocking, lock free, first-in first-out (FIFO) queues employing processor synchronization primitives, such as load-linked/store conditional (LL/SC).

2. Background Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises at least one central processing unit (CPU) and supporting hardware, such as communications buses and memory, necessary to store, retrieve and transfer information. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

The overall speed of a computer system is typically improved by increasing parallelism, and specifically, by employing multiple CPUs (also referred to as processors). The modest cost of individual processors packaged on integrated circuit chips has made multiprocessor systems practical, although such multiple processors add more layers of complexity to a system.

From the standpoint of the computer's hardware, most systems operate in fundamentally the same manner. Processors are capable of performing very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, using software having enhanced function, along with faster hardware.

First-in first-out (FIFO) queues are widely used in parallel applications and operating systems. Data are frequently enqueued onto and dequeued from FIFO queues by application and process threads. Generally, a FIFO queue is a data structure that provides an ordered list of different memory locations containing data. Each of the different memory locations of the queue is typically referred to as a "node". To keep the nodes in order, each node is provided with a "next" pointer that identifies (i.e., points to) the memory location of the next node in the queue. The first node of the queue is referred to as the "head node" and the last node of the queue is referred to as the "tail node". Because the tail node is the last node of the queue the tail node's next pointer is typically NULL. The queue has a head pointer that identifies (i.e., points to) the head node and a tail pointer the identifies (i.e., points to) the tail node.

A node is enqueued by inserting it after the current tail node of the queue so that the enqueued node becomes the new tail node of the queue. Accordingly, in order to enqueue a node on the queue, the thread must determine which node is the current tail node. To accomplish this, the thread typically makes use of the queue's tail pointer.

A node is dequeued at the head of the queue, so that the current head node is dequeued and the next node becomes the new head node of the queue. Accordingly, in order to dequeue a node on the queue, the thread must determine which node is the current head node. To accomplish this, the thread typically makes use of the queue's head pointer.

As noted above, application and process threads enqueue and dequeue data on FIFO queues. A number of different such threads may make concurrent use of the queue. Concurrent use of the queue makes maintaining the integrity of the queue difficult. Nonetheless, the integrity of the queue must be maintained through all the possible conditions that the queue may encounter.

Concurrent access must be synchronized to maintain the integrity of the queue. Algorithms for concurrent data structures, including FIFO queues, are either blocking or non-blocking. Blocking algorithms allow a slow or delayed process (or thread) to indefinitely prevent faster processes (or threads) from completing operations on the concurrent data structure. Non-blocking algorithms guarantee that if one or more active processes (or threads) are trying to perform operations on the concurrent data structure, some operation will complete within a finite number of steps. Non-blocking algorithms are typically preferred over blocking algorithms because blocking algorithms disadvantageously experience significant performance degradation when a process (or thread) is halted or delayed due to the occurrence of events such as processor scheduling preemption, page faults, and cache misses.

Lock-free algorithms have also been proposed for shared data structures, including concurrent FIFO queues. Lock-free algorithms allow concurrent update of shared data structures without resorting to critical sections protected by operating system managed locks. Some of the most common benefits of lock-free synchronization include:

More efficient than lock-based algorithms;
Improved scalability on multiprocessor machines;
Usable in almost all environments, including interrupt handlers;
Non-blocking implementation naturally avoids priority inversion;
Cooperate techniques ensure that progress is made, unlike unproductive spin locks.

Special processor synchronization primitives, such as the traditional compare-and-swap or the modern load-linked/store conditional (e.g., PowerPC ldarx/stdcx) have been used to implement efficient lock-free algorithms for both FIFO queues and last-in first-out (LIFO) queues (LIFO queues are also referred to as LIFO stacks). A concurrent LIFO queue is quite simple to implement; however, an efficient concurrent FIFO queue is significantly more challenging.

An efficient state of the art concurrent queue is described by Michael et al., "Simple, Fast, and Practical Non-Blocking and Blocking Concurrent Algorithms", Symposium of Principles of Distributed Computing, 1996. Problems with the Michael et al. publication include:

A separate link node is allocated for each user node enqueued to the queue. Thus, the nodes are not directly enqueued to the queue because an extra link node is required. This constricts queue performance, as well as the manner in which threads may use the queue. Allocating this extra link node adds overhead and makes this algorithm impractical for interrupt handlers due to memory allocation issues.

The traditional compare-and-swap primitive requires special considerations (e.g., unique number generator) to prevent the classical ABA problem (discussed below), adding additional overhead.

In general, the "ABA problem", which is well known in the art, occurs when a process or thread reads a value A in a shared memory location, such as a FIFO queue, computes a new value, and then attempts an operation, such as the compare-and-swap primitive, which may succeed even though it should not, if between the read and the compare-and-swap one or more other processes change the value A to a value B and then back to the value A again. The Michael et al. publication describes a concurrent non-blocking queue in which the ABA problem is addressed by assigning an extra "count" field to the queue pointers, such as the next pointer of the tail node. Thus, for example, each time the tail node is modified by any thread, the count associated with the next pointer of the tail node would be incremented. In a situation where the ABA problem would otherwise occur, if the tail node has been dequeued and re-enqueued on another node, a thread trying to enqueue a new node onto the queue would recognize that the next pointer "count" field of what it believes to be the tail node has changed, even if the next pointer still has the same value as before. Therefore, the thread would not complete its enqueue operation, thereby preventing the ABA problem from occurring, but at the expense of additional overhead necessary to provide the extra "count" field.

U.S. Pat. No. 6,889,269, entitled "NON-BLOCKING CONCURRENT QUEUES WITH DIRECT NODE ACCESS BY THREADS", which issued on May 3, 2005 to Forin et al. and is assigned to Microsoft Corporation, at least partially solves some of the problems in the Michael et al. publication, but introduces a dequeue timing window. Problems with the Forin et al. patent include:

The user node is advantageously enqueued directly to the queue, without requiring an extra link node; however, a dummy node must be repeatedly dequeued and re-enqueued thereby adding significant overhead. For example, if the average queue depth (AQD) is 2 user nodes, 25% of all enqueues will be unproductive dummy nodes or a 1:2 ratio. In general, the ratio of dummy node enqueues to user node enqueues is 1:AQD (e.g., 1:2, 1:3, 1:4, . . . ).

The solution to the ABA problem is improved; however, a queue specific number is required to uniquely identify the queue that contains the node.

A timing window in the queue code incorrectly detects an empty queue when only a single user node is enqueued. That is, if the dummy node is momentarily dequeued by a first thread, leaving a single user node, a dequeue on a second thread will see an empty queue. This can cause some applications to function improperly.

Although the Forin et al. patent states that its invention is related to FIFO queues employing non-blocking atomic compare-and-swap (CAS) instructions, no CAS instruction is described in the patent or employed in its flow diagrams.

Some additional storage ordering fences would be required to run the algorithm disclosed in the Forin et al. patent on weakly consistent processors (discussed below).

The development of faster processors led to the creation of weakly consistent processor architecture, which permits some amounts of speculation (such as branch speculation) and out-of-order execution of instructions. To enable these types of execution, a processor assigns a series of instructions to a group when no dependencies exist between instructions within that group. Instructions within a group can be executed in parallel or out-of-order (i.e., later instructions executed before earlier instructions). However, due to data dependencies, particularly with load and store instructions, within instruction sequences, instructions in different groups must be executed in program order to obtain correct processing results. Hence, additional storage ordering fences would be required to run the algorithms, such as the algorithm disclosed in the Forin et al. patent, on weakly consistent processors. The Forin et al. patent does not, however, elaborate on the additional storage ordering fences that are necessary to make its algorithm workable on weakly consistent processors.

It is also not uncommon to use a concurrent LIFO queue (stack) as a drop off queue; however, the LIFO queue must be converted into a FIFO queue before normal in-order task processing can be performed. For example, U.S. Pat. No. 5,671,446, entitled "METHOD AND APPARATUS FOR ATOMICALLY ACCESSING A QUEUE IN A MEMORY STRUCTURE WHERE LIFO IS CONVERTED TO FIFO", which issued on Sep. 23, 1997 to Rakity et al. and is assigned to Apple Computer, Inc., discloses such an approach. This approach has a number of disadvantages:

Converting a LIFO queue to a FIFO queue can be expensive in terms of performance.

All nodes in the LIFO queue must be converted to FIFO order before a single node can be dequeued.

A single task must perform the LIFO to FIFO conversion. On a multiprocessor system this conversion can become a bottleneck.

Therefore, a need exists for an enhanced mechanism for providing a concurrent, non-blocking, lock free FIFO queue.

SUMMARY OF THE INVENTION

According to the preferred embodiments of the invention, a dummy node is enqueued to a concurrent, non-blocking, lock-free FIFO queue only when necessary to prevent the queue from becoming empty. The dummy node is only enqueued during a dequeue operation and only when the queue contains a single user node during the dequeue operation. This reduces overhead relative to conventional mechanisms that always keep a dummy node in the queue. User nodes are enqueued directly to the queue and can be immediately dequeued on-demand by any thread. Preferably, the enqueueing and dequeueing operations include the use of load-linked/store conditional (LL/SC) synchronization primitives. This solves the ABA problem without requiring the use a unique number, such as a queue-specific number, and contrasts with conventional mechanisms that include the use of compare-and-swap (CAS) synchronization primitives and address the ABA problem through the use of a unique number. In addition, storage ordering fences are preferably inserted to allow the algorithm to run on weakly consistent processors.

The foregoing and other features and advantages of the invention will be apparent from the following more particular description of the preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements.

In FIG. 4A, a dummy node is dequeued from the FIFO queue in the state shown in FIG. 3. In FIG. 4B, a dummy node is re-enqueued to the FIFO queue in the state shown in FIG. 4A. In FIG. 4C, a user node is dequeued from the FIFO queue in the state shown in FIG. 4B.

FIG. 5 is a diagram of exemplary pseudo-code used to illustrate the data layout of the Queue class and the Node structure in accordance with the preferred embodiments of the present invention.

FIG. 6 is a diagram of exemplary pseudo-code used to illustrate the enqueue function declared in the Queue class of FIG. 5.

FIG. 7 is a diagram of exemplary pseudo-code used to illustrate the enqueueStep2 function declared in the Queue class of FIG. 5.

FIG. 8 is a diagram of exemplary pseudo-code used to illustrate the dequeue function declared in the Queue class of FIG. 5.

FIG. 9 is a diagram of exemplary pseudo-code used to illustrate the enqueueDummy function declared in the Queue class of FIG. 5.

DETAILED DESCRIPTION OF THE PREFERRED EMBODIMENTS

1.0 Overview

Figure 1:
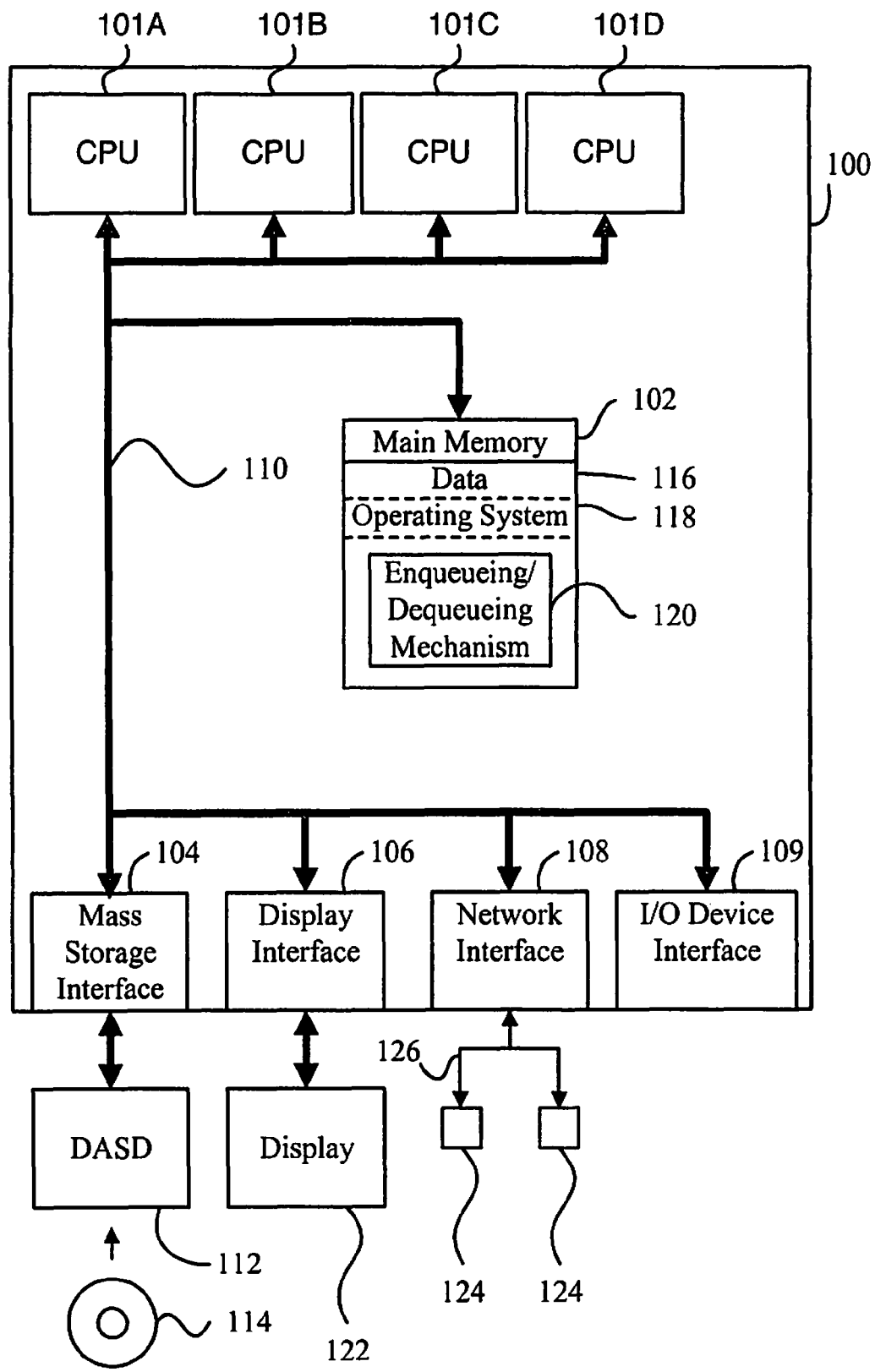
FIG. 1 is a block diagram of a computer system for providing a concurrent, non-blocking, lock-free FIFO queue in accordance with the preferred embodiments of the present invention.

In accordance with the preferred embodiments of the invention, a concurrent, non-blocking, lock-free FIFO queue is implemented using standard load-linked/store conditional (LL/SC) synchronization primitives. Use of load-linked/store conditional synchronization primitives instead of compare-and-swap (CAS) synchronization primitives solves the ABA problem without requiring some sort of unique number, such as a queue-specific number, and allows more efficient customized code. Accordingly, the preferred embodiments of the present invention contrast with conventional mechanisms that include the use of compare-and-swap synchronization primitives and that address the ABA problem through the use of a unique number. Also, more efficient code can be generated by careful use of load-linked/store conditional synchronization primitives.

Preferably, an algorithm in accordance with the preferred embodiments of the present invention uses carefully inserted storage ordering fences (e.g., PowerPC sync instruction) to enable efficient and correct execution on weakly consistent processors.

The algorithm in accordance with the preferred embodiments of the present invention is cooperative. If an enqueue falls behind, a subsequent enqueue or dequeue operation will help complete the current enqueue. The enqueue is a two step process:

1. Link the new node to the end of the queue.
2. Update the queue's tail pointer to point at the new node.

If the current enqueue falls behind, e.g., the current enqueue is preempted by a higher priority task or page fault occurs between the above listed step 1 and step 2, a subsequent enqueue or dequeue operation can complete step 2 for the current enqueue.

Using a dummy node to allow concurrent enqueue and dequeue operations is a technique well known in the art; however, the current state of the art algorithms keep the dummy node in the queue at all times. In accordance with the preferred embodiments of the present invention, a dummy node is enqueued to the queue only when necessary to prevent the queue from becoming empty. That is, the dummy node is only enqueued during a dequeue operation and only when the queue contains a single user node during the dequeue operation. If at least two user nodes are enqueued, the dummy node does need to be enqueued. This reduces overhead relative to conventional mechanisms, such as described in the Forin et al. patent, that always keep a dummy node in the queue.

To demonstrate this advantage, a test was constructed wherein sixteen user nodes were repeatedly enqueued and dequeued by sixteen threads for a ten second interval using an algorithm in accordance with the preferred embodiments of the present invention (described in more detail in the Detailed Description section below) and the algorithm described in the Forin et al patent. The results of the test are shown in Table 1 below.

TABLE 1

Test description: 16 user nodes are repeatedly enqueued and dequeued by 16 threads for a 10 second interval.

| Algorithm Tested | Dummy Node Enqueues | User Node Enqueues | Ratio (Dummy Nodes/User Nodes) |
| --- | --- | --- | --- |
| Preferred Embodiments of Present Invention | 1 | 13,504,240 | 1:13,504,240 |
| Forin et al. Patent | 431,279 | 7,274,904 | 1:17 (approx.) |

As shown in Table 1, the algorithm described in the Forin et al. patent enqueues the dummy node once every seventeen enqueues. In contrast, the algorithm in accordance with the preferred embodiments of the present invention only re-enqueues the dummy node once at the end of the test run. Also, the algorithm in accordance to the preferred embodiments of the present invention is able to enqueue over 50% more user nodes in the ten second interval than the algorithm described in the Forin et al. patent. In addition, the algorithm described in the Forin et al. patent disadvantageously leaves thirteen user nodes in the queue at the end of the test run due to its dequeue timing window flaw discussed earlier.

In general, testing has shown that an algorithm in accordance with the preferred embodiments of the present invention rarely enqueues the dummy node when the producer threads (enqueues) and consumer threads (dequeues) are running at approximately the same rate.

According to the preferred embodiments of the present invention, user nodes are enqueued directly to the queue and can be immediately dequeued on-demand by any thread.

An algorithm in accordance with the preferred embodiments of the present invention can be used in virtually all programming environments, including low level kernel interrupt handlers. Accordingly, the preferred embodiments of the present invention contrast with conventional mechanisms, such as that in the Michael publication, that require extra link node memory management that limits their usage. As a consequence, such conventional mechanisms are not well suited to interrupt handlers that have memory allocation restrictions, for example.

2.0 Detailed Description

A computer system implementation of the preferred embodiments of the present invention will now be described with reference to FIG. 1 in the context of a particular computer system 100, i.e., an IBM eServer iSeries or System i computer system. However, those skilled in the art will appreciate that the FIFO queue, method, apparatus, and computer program product of the present invention apply equally to any computer system, regardless of whether the computer system is a complicated multi-user computing apparatus, a single user workstation, a PC, or an embedded control system. As shown in FIG. 1, computer system 100 comprises a one or more processors 101A, 101B, 101C and 101D, a main memory 102, a mass storage interface 104, a display interface 106, a network interface 108, and an I/O device interface 109. These system components are interconnected through the use of a system bus 110.

FIG. 1 is intended to depict the representative major components of computer system 100 at a high level, it being understood that individual components may have greater complexity than represented in FIG. 1, and that the number, type and configuration of such components may vary. For example, computer system 100 may contain a different number of processors than shown.

Mass storage interface 104 is used to connect mass storage devices (such as a direct access storage device 112) to computer system 100. One specific type of direct access storage device 112 is a readable and writable CD ROM drive, which may store data to and read data from a CD ROM 114.

Main memory 102 in accordance with the preferred embodiments contains data 116, an operating system 118, and an enqueueing/dequeueing mechanism 120. While the enqueueing/dequeueing mechanism 120 is shown separate and discrete from operating system 118 in FIG. 1, the preferred embodiments expressly extend to enqueueing/dequeueing mechanism 120 being implemented within the operating system 118 and/or a kernel. As is well known in the art, a kernel may be integrated into the operating system 118 and provides kernel level services to the operating system 118 and to other programs. For example, enqueueing/dequeueing mechanism 120 may be implemented in an interrupt handler and/or a system task dispatcher included in the kernel. In addition, enqueueing/dequeueing mechanism 120 could be implemented alone or together in application software, utilities, or other types of software within the scope of the preferred embodiments. For example, the present invention is applicable to a wide range of applications such as database, networking, task dispatching, and storage management.

Computer system 100 utilizes well known virtual addressing mechanisms that allow the programs of computer system 100 to behave as if they have access to a large, single storage entity instead of access to multiple, smaller storage entities such as main memory 102 and DASD device 112. Therefore, while data 116, operating system 118, and enqueueing/dequeueing mechanism 120, are shown to reside in main memory 102, those skilled in the art will recognize that these items are not necessarily all completely contained in main memory 102 at the same time. It should also be noted that the term "memory" is used herein to generically refer to the entire virtual memory of the computer system 100.

Data 116 represents any data that serves as input to or output from any program in computer system 100. Operating system 118 is a multitasking operating system known in the industry as OS/400 or IBM i5/OS; however, those skilled in the art will appreciate that the spirit and scope of the present invention is not limited to any one operating system.

According to the preferred embodiments of the present invention, the enqueueing/dequeueing mechanism 120 provides the functionality for implementing a concurrent, non-blocking, lock-free FIFO queue, as discussed in more detail below. Also in accordance with the preferred embodiments of the present invention, the enqueueing/dequeueing mechanism 120 includes the data layout of the Queue class and the Node structures shown in FIG. 5, the code for the enqueue function shown in FIG. 6, the code for the enqueueStep2 function shown in FIG. 7, the code for the dequeue function shown in FIG. 8, and the code for the enqueueDummy function shown in FIG. 9. The enqueueing/dequeueing mechanism 120 may be pre-programmed, manually programmed, transferred from a recording media (e.g., CD ROM 114), or downloaded over the Internet (e.g., over network 126).

Processors 101A, 101B, 101C and 101D (also collectively referred to herein as "processors 101") may be constructed from one or more microprocessors and/or integrated circuits. Processors 101 execute program instructions stored in main memory 102. Main memory 102 stores programs and data that may be accessed by processors 101. When computer system 100 starts up, processors 101 initially execute the program instructions that make up operating system 118. Operating system 118 is a sophisticated program that manages the resources of computer system 100. Some of these resources are processors 101, main memory 102, mass storage interface 104, display interface 106, network interface 108, I/O device interface 109 and system bus 110.

Although computer system 100 is shown to contain four processors and a single system bus, those skilled in the art will appreciate that the present invention may be practiced using a computer system that has a different number of processors and/or multiple buses. In addition, the interfaces that are used in the preferred embodiments each include separate, fully programmed microprocessors that are used to off-load compute-intensive processing from processors 101. However, those skilled in the art will appreciate that the present invention applies equally to computer systems that simply use I/O adapters to perform similar functions.

Display interface 106 is used to directly connect one or more displays 122 to computer system 100. These displays 122, which may be non-intelligent (i.e., dumb) terminals or fully programmable workstations, are used to allow system administrators and users (also referred to herein as "operators") to communicate with computer system 100. Note, however, that while display interface 106 is provided to support communication with one or more displays 122, computer system 100 does not necessarily require a display 122, because all needed interaction with users and processes may occur via network interface 108.

Network interface 108 is used to connect other computer systems and/or workstations 124 to computer system 100 across a network 126. The present invention applies equally no matter how computer system 100 may be connected to other computer systems and/or workstations, regardless of whether the network connection 126 is made using present-day analog and/or digital techniques or via some networking mechanism of the future. In addition, many different network protocols can be used to implement a network. These protocols are specialized computer programs that allow computers to communicate across network 126. TCP/IP (Transmission Control Protocol/Internet Protocol) is an example of a suitable network protocol.

The I/O device interface 109 provides an interface to any of various input/output devices.

At this point, it is important to note that while this embodiment of the present invention has been and will be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROMs (e.g., CD ROM 114 of FIG. 1), and transmission type media such as digital and analog communications links (e.g., network 126 in FIG. 1).

Figure 2:
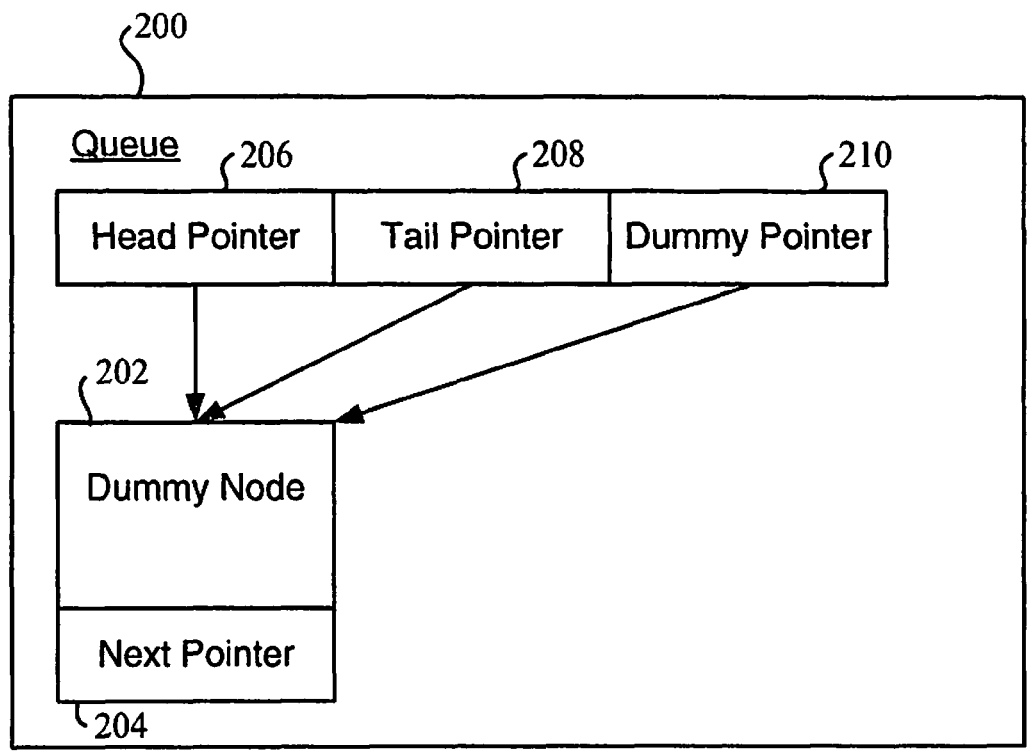
FIG. 2 is a block diagram of an initial state of a FIFO queue in accordance with the preferred embodiments of the present invention.

FIG. 2 is a block diagram of an initial state of a FIFO queue 200 in accordance with the preferred embodiments of the present invention. In general, FIFO queue 200 comprises a stored list specifying a succession of nodes which are locations in a memory containing data such as main memory 102 shown in FIG. 1. Dummy nodes are not available to external threads. User nodes, on the other hand, may be enqueued and dequeued by external process or application threads.

In its initial state (i.e., just after it is constructed) shown in FIG. 2, the stored list that comprises the FIFO queue 200 is specified as follows: a dummy node 202 having a next pointer 204; a head pointer 206 that points to the dummy node 202; a tail pointer 208 that points to dummy node 202; and a dummy pointer 210 that points to dummy node 202. Hence, all of the queue's head, tail and dummy pointers initially point at the dummy node 202. In accordance with the preferred embodiments of the present invention, dummy nodes are only enqueued to keep the FIFO queue 200 from becoming logically empty. The FIFO queue 200 is "logically empty" when only a dummy node is enqueued. Because there is no next node after the dummy node 202 at this time, the dummy node's next pointer 204 is preferably set to NULL.

Figure 3:
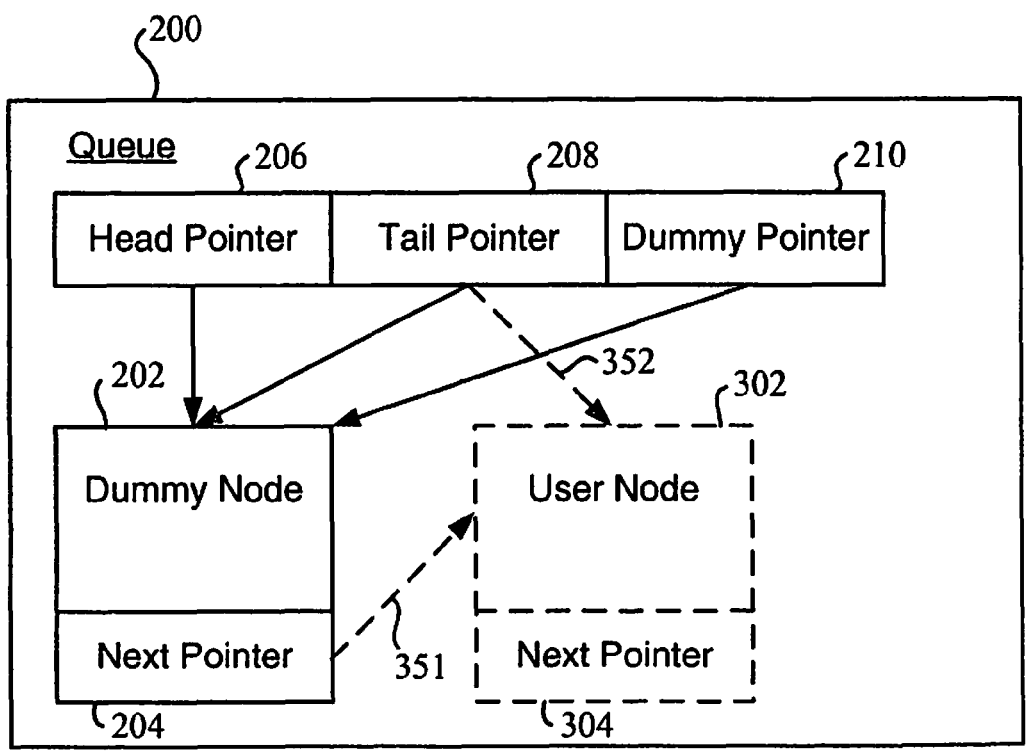
FIG. 3 is a block diagram illustrating an enqueueing operation in accordance with the preferred embodiments of the present invention wherein a user node is enqueued to the initial state of the FIFO queue shown in FIG. 2.

FIG. 3 is a block diagram illustrating an enqueueing operation in accordance with the preferred embodiments of the present invention wherein a user node 302 is enqueued to the initial state of the FIFO queue 200 shown in FIG. 2, i.e., a logically empty queue. The user node 302 has a next pointer 304. Because there is no next node after the user node 202 at this time, the user node's next pointer 304 is preferably set to NULL. The dummy node 202 remains in the FIFO 200 until naturally dequeued, even though the FIFO queue 200 is not logically empty. In accordance with the preferred embodiments of the present invention, the enqueueing operation shown in FIG. 3 occurs in two steps. First, the enqueueing operation links the new node, i.e., user node 302, to the end of the FIFO queue 200 (step 351). This is accomplished by setting the dummy node's next pointer 204 to point at the user node 302. Then, the queue's tail pointer 208 is updated to point to the new node, i.e., user node 302 (step 352).

Figure 4A:
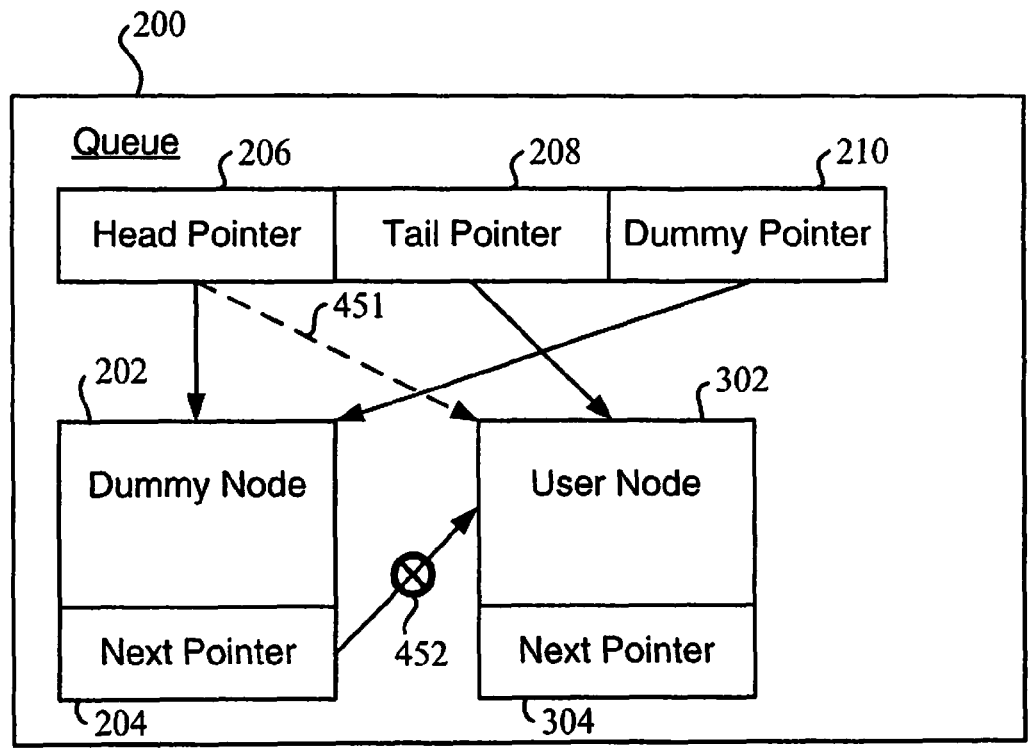
FIGS. 4A, 4B and 4C are block diagrams collectively illustrating a dequeue operation in accordance with the preferred embodiments of the present invention.
Figure 4B:
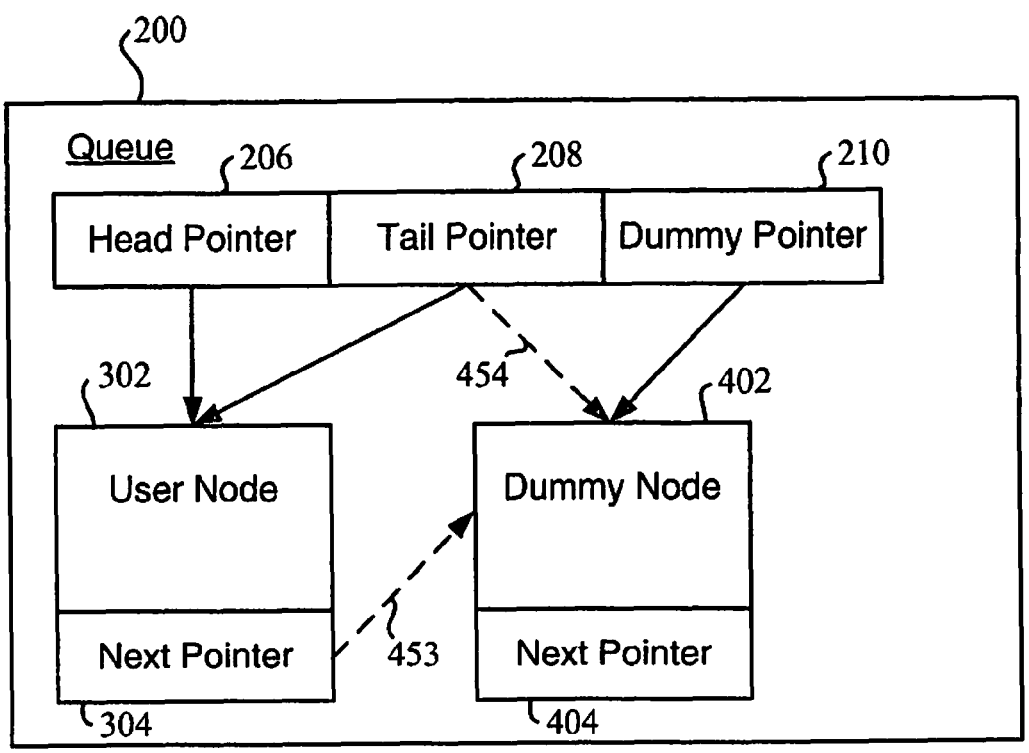
Figure 4C:
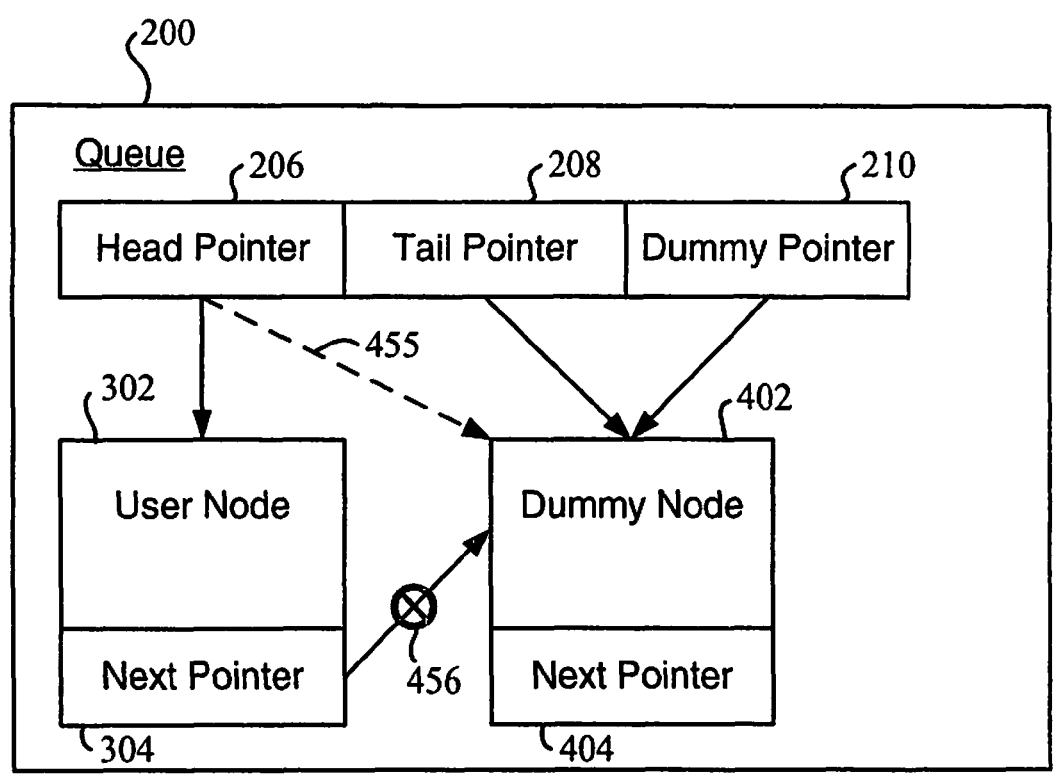

FIGS. 4A, 4B and 4C are block diagrams collectively illustrating a dequeue operation in accordance with the preferred embodiments of the present invention. More particularly, FIGS. 4A-4C together illustrate how the dummy node is dequeued and then re-enqueued when the last user node is dequeued. In FIG. 4A, the dummy node 202 is dequeued from the FIFO queue 200 in the state shown in FIG. 3. In FIG. 4B, a dummy node is re-enqueued to the FIFO queue 200 in the state shown in FIG. 4A. In FIG. 4C, the user node 302 is dequeued from the FIFO queue 200 in the state shown in FIG. 4B.

It should be understood that in accordance with the preferred embodiments of the present invention the scenario shown in FIGS. 4A-4C is an anomaly. This is because during steady state, assuming there are at least two user nodes in the queue, the dummy node is rarely enqueued. Although the scenario shown in FIGS. 4A-4C is an anomaly, this scenario is important to understand from the perspective of how the dummy node is used in accordance with the preferred embodiments of the present invention.

In FIG. 4A, the dummy node 202 is dequeued from the FIFO queue 200 in the state shown in FIG. 3. The dummy node 202 is dequeued because it is the first node in the FIFO queue 200. The dummy node 202 is set aside at this time. In accordance with the preferred embodiments of the present invention, the dequeueing of the dummy node 202 is accomplished as follows. The queue's head pointer 206 is set to point to the user node 302 (step 451). In addition, the dummy node's next pointer 204 is set to NULL (step 452).

In FIG. 4B, a dummy node is re-enqueued to the FIFO queue 200 in the state shown in FIG. 4A. The re-enqueued dummy node is denoted in FIG. 4B as dummy node 402. The dummy node 402 is preferably set aside dummy node 202, or may be another dummy node. In any event, a dummy node must be re-enqueued before the last user node can be dequeued. In accordance with the preferred embodiments of the present invention, the re-enqueueing of the dummy node 402 is accomplished as follows. The current tail node's next pointer 304 is set to point at the dummy node 402 (step 453). In this way, the dummy node 402 is linked to the end of the FIFO queue 200. Then, the queue's tail pointer 208 is set to point at the dummy node 402 (step 454). In addition, because there is no next node after the dummy node 202 at this time, the dummy node's next pointer 404 is set to NULL.

In FIG. 4C, the user node 302 is dequeued from the FIFO queue 200 in the state shown in FIG. 4B. The user node 302 is dequeued, leaving only the dummy node 402 left in the FIFO queue 200. In accordance with the preferred embodiments of the present invention, the dequeueing of user node 302 is accomplished as follows. The queue's head pointer 206 is set to point at the dummy node 402 (step 455). Also, the user node's next pointer 304 is set to NULL (step 456).

According to the preferred embodiments of the present invention, the queue must atomically update three unrelated pointers: the queue's head pointer; the queue's tail pointer; and the node's next pointer. All three pointers cannot be atomically updated at the same time, making this a difficult problem to solve. The load-linked/store conditional synchronization primitives will atomically update one pointer and allow testing (loads) of unrelated shared memory between the load-linked and store conditional. The compare-and-swap (CAS) synchronization primitives could be used as an alternative; however, the ABA problem inherent in CAS synchronization primitives would need to be addressed and the implementation would be significantly less efficient.

FIG. 5 is a diagram of exemplary pseudo-code used to illustrate the data layout of the Node structure and the Queue class in accordance with the preferred embodiments of the present invention. The Node structure is shown at line 501. The Queue class is shown at line 502 and declares the following functions: enqueue; enqueueStep2; dequeue; and enqueueDummy. The enqueue function at line 503 is a public interface to enqueue a new node. The enqueueStep2 function at line 505 is a private function that performs the second half of the enqueue operation (i.e., the enqueueStep2 function updates the tail pointer). The dequeue function at line 504 is a public interface to dequeue a node. The enqueueDummy function at line 506 enqueues a dummy node, if required.

A node may be either a user node or a dummy node. A user node is allocated by a user and contains user specific data. One dummy node is allocated per queue and is not visible to the user.

It will be appreciated by those skilled in the art that the data layout of the Queue class and the Node structure illustrated in FIG. 5 is exemplary. Other implementations are within the spirit and scope of the present invention. For example, the Queue class could be implemented as a template class specifying the Node as a template parameter to generalize the layout of the user's Node structure. For simplicity and clarity, a non-template class is illustrated.

The enqueue operation is a two step process:
1. Link the new node to the end of the queue.
2. Update the queue's tail pointer to point to the new node.

The first step, i.e., linking the new node to the end of the queue, corresponds to the enqueue function designated at line 503 in the Queue class of FIG. 5 and is discussed in more detail below with reference to FIG. 6. The second step, i.e., updating the queue's tail pointer to point to the new queue, corresponds to the enqueueStep2 function declared at line 505 in the Queue class in FIG. 5 and is discussed in more detail below with reference to FIG. 7. In general, the enqueue operation always assumes that at least one node is always enqueued in the queue.

It should be understood that the exemplary pseudo-code diagrammed in FIGS. 6-9 is for purpose of illustration, and does not serve to limit the present invention. One skilled in the art will appreciate that other implementations are within the spirit and scope of the present invention. For example, various steps are set forth in FIGS. 6-9 in their preferred order. It must be understood, however, that the various steps may occur at different times relative to one another than shown, or may occur simultaneously. Moreover, those skilled in the art will appreciate that one or more of the steps may be omitted.

FIG. 6 is a diagram of exemplary pseudo-code used to illustrate the enqueue function declared at line 503 in the Queue class of FIG. 5. At line 601, the enqueue function begins with the code continuing to loop until the new node is successfully linked to the end of the queue. At line 602, a snapshot of the queue's tail pointer is taken. The queue's tail pointer is always assumed to be non-NULL, since at least one node is always enqueued. At line 603, a snapshot of the tail node's next pointer is taken and a reservation is set to detect any stores to the tail node's next pointer. At line 604, the storage ordering fence is required for weakly consistent processors to make sure that the tail node's next pointer is current before it is tested (at line 605). At line 605, if the tail has not changed, that means we're still working with the current tail node and the queue's tail pointer and the tail node's next pointer are consistent. If the tail has changed, the enqueue function restarts at line 601.

At line 605.1, if the current tail node's next pointer is non-NULL, this means that an enqueue operation is partially complete and the tail must be updated, so enqueue Step2 (discussed below with reference to FIG. 7) is called to help complete the partial enqueue. The previous enqueue must be complete before the next enqueue can be started, so the enqueue function restarts at line 601.

At line 605.2, the enqueue function now tries to conditionally link the new node to the end of the queue. The store conditional may fail if another thread is currently enqueueing a node.

At line 606, the final step of the enqueue function calls enqueueStep2 (discussed below with reference to FIG. 7) to update the queue's tail pointer to point to the new node.

FIG. 7 is a diagram of exemplary pseudo-code used to illustrate the enqueueStep2 function declared at line 505 in the Queue class of FIG. 5. The enqueueStep2 function can be called by both the enqueue function and the dequeue function to help complete a partial enqueue. At line 701, the enqueueStep2 function begins with the code continuing to loop until the tail is updated. This is a cooperative effort that can be concurrently performed by multiple threads. Hence, it is possible that another thread may update the tail before this thread can do it and no update is necessary. At line 702, a snapshot of the queue's tail pointer is taken and a reservation is set to detect any stores to the queue's tail pointer. At line 703, the storage ordering fence is required for weakly consistent processors to make sure that the tail node's next pointer is current. At line 704, a snapshot of the tail node's next pointer is taken. At line 705, if the tail node's next pointer is NULL, the loop is exited because the tail has already been updated by another thread. At line 706, the enqueueStep2 function tries to conditionally swing the queue's tail pointer to the next node. The store conditional may fail if another thread is currently executing enqueueStep2.

The dequeue operation is slightly more complex than the enqueue operation. Dequeue considerations include:
- If the dummy node is dequeued, set it aside and try to dequeue the next node.
- If only a single user node is enqueued, enqueue the dummy node before dequeueing the user node. The queue must never be empty.
- If the head node is partially enqueued, help complete the enqueue. The current head node cannot be dequeued until it is completely enqueued.
- If the queue is logically empty, return NULL. As mentioned earlier, the queue is logically empty when only the dummy node is enqueued.

FIG. 8 is a diagram of exemplary pseudo-code used to illustrate the dequeue function declared at line 504 in the Queue class of FIG. 5. At line 801, the dequeue function begins with the code continuing to loop until a user node is successfully dequeued or a logically empty queue is detected. At line 802, a snapshot of the queue's head pointer is taken and a reservation is set to detect any stores to the queue's head pointer. At line 803, the storage ordering fence is required for weakly consistent processors to make sure the head node's next pointer and the queue's tail pointer are current. At line 804, a snapshot of the head node's next pointer is taken. At line 805, if the queue' head and tail pointers are equal, the state of the queue will not allow a node to be dequeued. One of three actions is performed to change the queue state to allow a node to be dequeued. These three actions are respectively denoted at lines 805.1, 805.2 and 805.3.

At line 805.1, if the only node in the queue is the dummy node, the queue is logically empty. A store conditional is performed to verify that the queue's head pointer has not changed. If the head has not changed, the dequeue function returns a NULL to indicate that the queue is empty. If the head has changed, the dequeue function restarts at line 801.

At line 805.2, if the only node in the queue is a user node, the enqueueDummy function (discussed below with reference to FIG. 9) is called to enqueue the dummy node. After the dummy node is enqueued, the user node can be dequeued. Accordingly, once the dummy node is enqueued the dequeue function restarts at line 801.

At line 805.3, if the second node is partially enqueued, the enqueueStep2 function (discussed above with respect to FIG. 7) is called to help complete the enqueue by updating the queue's tail pointer. Once the enqueueStep2 function is complete, the dequeue function restarts at line 801.

At line 806 the dequeue function tries to conditionally dequeue the head node. The store conditional may fail if another thread is concurrently dequeueing the node. If the store conditional is successful, the following steps are performed.

At line 806.1, the dequeued node's next pointer is set to NULL. This prepares the dequeued node to be enqueued again.

At line 806.2, if the dequeued node was a user node, the user node is returned to the caller. On the other hand, at line 806.3, if the dequeued node was a dummy node, the dummy node is set aside and the dequeue function restarts at line 801 to dequeue a user node.

FIG. 9 is a diagram of exemplary pseudo-code used to illustrate the enqueueDummy function declared at line 506 in the Queue class of FIG. 5. The enqueueDummy function only enqueues the dummy node if the queue contains a single user node. At line 901, the enqueueDummy function begins with the code continuing to loop until the dummy node is successfully enqueued or the dummy node no longer needs to be enqueued. At line 902, a snapshot of the queue's tail pointer is taken. At line 903, a snapshot of the tail node's next pointer is taken and a reservation is set to detect any stores to the tail node's next pointer. At line 904, the storage ordering fence is required for weakly consistent processors to make sure the queue's head and tail pointers are current. At line 905, the enqueueDummy function verifies that the dummy node still needs to be added. First, verify that the tail has not changed (i.e., if the tail changed that means another node is being enqueued, so in that case don't bother to enqueue the dummy node). Second, verify that the queue's head and tail pointers are equal (i.e., only one node is enqueued). Third, verify that the tail node's next pointer is NULL (i.e., if the tail node's next pointer is non-NULL that means that a partial enqueue is in progress). Fourth, verify that the dummy node is not already enqueued.

At line 905.1, the enqueueDummy function now tries to conditionally enqueue the dummy node. The store conditional may fail if another thread is concurrently enqueueing a node. If the dummy node is successfully enqueued, the enqueueDummy function is complete. Otherwise, the enqueueDummy function restarts at line 901.

At line 906, if the dummy node no longer needs to be enqueued, the enqueueDummy function is complete. That is, one of the four conditions verified at line 905 is false.

One skilled in the art will appreciate that many variations are possible within the scope of the present invention. For example, while the enqueueing/dequeueing mechanism is shown separate and discrete from the operating system in FIG. 1, the present invention extends to implementation within an operating system and/or kernel. In addition, the present invention could be implemented alone or together in application software, utilities, or other types of software. For example, the present invention is applicable to a wide range of applications such as database, networking, task dispatching, and storage management. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A method of implementing a queue, comprising the steps of:
    (a) enqueueing a user node to the end of a queue, wherein prior to the enqueueing step (a), the queue comprises at least a dummy node having a next pointer to a next node, and wherein the user node has a next pointer to a next node, and wherein the enqueueing step (a) includes the steps of:
        linking the user node to the end of the queue by setting the next pointer of a tail node to point to the user node;
        updating a tail pointer of the queue to point to the user node, wherein the updating step is not completed during the enqueueing step (a) but is completed during a subsequent enqueue operation or a subsequent dequeue operation;
    (b) after the enqueueing step (a), dequeueing the dummy node from the queue;
    (c) after the dequeueing step (b), conditionally dequeueing a head node from the queue;
    (d) during the conditional dequeueing step (c), enqueueing another dummy node to the end of the queue but only if the queue contains one and no more than one user node.

2. The method as recited in claim 1, wherein if the conditional dequeueing step (c) is successful in dequeueing a node, the method further comprising the steps of:
    setting the next pointer of the node dequeued in step (c) to NULL;
    if the node dequeued in step (c) is a user node, returning the dequeued user node;
    if the node dequeued in step (c) is a dummy node, restarting the conditional dequeueing step (c).

3. The method as recited in claim 1, wherein the enqueueing step (a), the dequeueing step (b), the conditional dequeueing step (c), and the enqueueing step (d) each includes the use of load-linked/store conditional primitives.

4. The method as recited in claim 3, wherein the enqueueing step (a), the dequeueing step (b), the conditional dequeueing step (c), and the enqueueing step (d) each includes the use of a storage ordering fence.

5. A computer program product for implementing a queue in a digital computing device having at least one processor, comprising:
    a plurality of executable instructions provided on computer readable recordable media, wherein the executable instructions, when executed by the at least one processor, cause the digital computing device to perform the steps of:
    (a) enqueueing a user node to the end of a queue, wherein prior to the enqueueing step (a), the queue comprises at least a dummy node having a next pointer to a next node, and wherein the user node has a next pointer to a next node, and wherein the enqueueing step (a) includes the steps of:
        linking the user node to the end of the queue by setting the next pointer of a tail node to point to the user node;
        updating a tail pointer of the queue to point to the user node, wherein the updating step is not completed during the enqueueing step (a) but is completed during a subsequent enqueue operation or a subsequent dequeue operation;
    (b) after the enqueueing step (a), dequeueing the dummy node from the queue;
    (c) after the dequeueing step (b), conditionally dequeueing a head node from the queue;

(d) during the conditional dequeueing step (c), enqueueing another dummy node to the end of the queue only if the queue contains one and no more than one user node.

6. The computer program product as recited in claim 5, wherein if the conditional dequeueing step (c) is successful in dequeueing a node, the method further comprising the steps of:

setting the next pointer of the node dequeued in step (c) to NULL;

if the node dequeued in step (c) is a user node, returning the dequeued user node;

if the node dequeued in step (c) is a dummy node, restarting the conditional dequeueing step (c).

7. The computer program product as recited in claim 5, wherein the enqueueing step (a), the dequeueing step (b), the conditional dequeueing step (c), and the enqueueing step (d) each includes the use of load-linked/store conditional primitives.

8. The computer program product as recited in claim 7, wherein the enqueueing step (a), the dequeueing step (b), the conditional dequeueing step (c), and the enqueueing step (d) each includes the use of a storage ordering fence.

* * * * *